(12) United States Patent
Saito et al.

(10) Patent No.: US 8,548,046 B2
(45) Date of Patent: Oct. 1, 2013

(54) TRANSCODER

(75) Inventors: Makoto Saito, Osaka (JP); Hiromu Hasegawa, Osaka (JP); Miyuki Yanagida, Tokyo (JP)

(73) Assignees: MegaChips Corporation, Osaka-shi (JP); NTT Electronics Corporation, Tokyo (JP)

( * ) Notice: Subject to any disclaimer, the term of this patent is extended or adjusted under 35 U.S.C. 154(b) by 907 days.

(21) Appl. No.: 12/394,513

(22) Filed: Feb. 27, 2009

(65) Prior Publication Data
US 2009/0238266 A1   Sep. 24, 2009

(30) Foreign Application Priority Data
Mar. 19, 2008   (JP) .................................. 2008-071531

(51) Int. Cl.
| H04N 7/26 | (2006.01) |
|---|---|
| H04N 7/12 | (2006.01) |
| H04N 7/46 | (2006.01) |
| H04B 1/66 | (2006.01) |
| H04N 7/50 | (2006.01) |
| H04N 7/32 | (2006.01) |

(52) U.S. Cl.
USPC ............ 375/240.03; 375/240.02; 375/240.05; 375/240.16; 375/240.25

(58) Field of Classification Search
USPC ............. 375/240.03, 240.02, 240.05, 240.25, 375/240.16
See application file for complete search history.

(56) References Cited

U.S. PATENT DOCUMENTS

| 6,473,459 | B1 | 10/2002 | Sugano et al. | |
|---|---|---|---|---|
| 2002/0181589 | A1 | 12/2002 | Wake et al. | |
| 2003/0174770 | A1* | 9/2003 | Kato et al. | 375/240.2 |
| 2005/0163221 | A1* | 7/2005 | Oka et al. | 375/240.16 |
| 2008/0008237 | A1* | 1/2008 | Tahara et al. | 375/240.05 |

FOREIGN PATENT DOCUMENTS

| JP | 4-23688 A | 1/1992 |
|---|---|---|
| JP | 7-312754 | 11/1995 |
| JP | 8-65677 A | 3/1996 |
| JP | 10-23421 | 1/1998 |
| JP | 10-313463 | 11/1998 |
| JP | 11-196410 | 7/1999 |

(Continued)

OTHER PUBLICATIONS

Zhijun Lei, Nicolas D. Georganas; "Rate adaptation transcoding for precoded video streams"; Dec. 2002; Multimedia '02: Proceedings of the tenth ACM international conference on Multimedia; Publisher: ACM; pp. 127-136.*

*Primary Examiner* — Andrew L Nalven
*Assistant Examiner* — Courtney Fields
(74) *Attorney, Agent, or Firm* — Oblon, Spivak, McClelland, Maier & Neustadt, L.L.P.

(57) ABSTRACT

A category setting part sets a type of a decoded image based on characteristics of the decoded image which are fineness of the decoded image and an intensity of movement of the decoded image. A code amount setting part sets a target code amount of an output image based on the type of the decoded image. A quantization step value setting part sets a quantization step value of the output image based on the target code amount of the output image. A transcoder can set the target code amount of the output image depending on fineness of the decoded image. The transcoder can distribute the target code amount of the output image to a reference image and a predicted image depending on the intensity of movement of the decoded image.

16 Claims, 5 Drawing Sheets

(56) References Cited

FOREIGN PATENT DOCUMENTS

| JP | 11-252509 | 9/1999 |
|----|-----------|--------|
| JP | 2000-41240 | 2/2000 |
| JP | 2000-350211 | 12/2000 |
| JP | 2002-232882 A | 8/2002 |
| JP | 2002-232894 | 8/2002 |
| JP | 2005-94458 A | 4/2005 |
| JP | 2007-72789 | 3/2007 |
| JP | 2007-129509 | 5/2007 |
| JP | 2008-42660 | 2/2008 |
| WO | WO 2010073746 A1 * | 7/2010 |

* cited by examiner

FIG. 4

|  |  | CODE AMOUNT RATIO ||
|---|---|---|---|
|  |  | I:P:B = 4:2:1 | I:P:B = 2:2:1 |
| CORRECTION CODE AMOUNT | −2Mbps | CATEGORY ID=0 (ACTIVITY SAMLL MOVING AMOUNT SMALL) | CATEGORY ID=2 (ACTIVITY SMALL MOVING AMOUNT LARGE) |
|  | +4Mbps | CATEGORY ID=1 (ACTIVITY LARGE MOVING AMOUNT SMALL) | CATEGORY ID=3 (ACTIVITY LARGE MOVING AMOUNT LARGE) |

TRANSCODER

BACKGROUND OF THE INVENTION

1. Field of the Invention

The present invention relates to a transcoder for decoding an input image into a decoded image and encoding the decoded image into an output image.

2. Description of the Background Art

Image compression techniques are widely used for reducing transmission load and storing load of image data. There are MPEG 2 and the like as conventional coding systems, and H.264 and the like as new coding systems. A transcoder executes system conversion between different coding systems for reducing transmission load and storing load of image data.

As a first stage, a transcoder inputs a compressed image according to a first coding system to generate an extension image according to the first coding system. As a second stage, the transcoder compresses the extension image according to a second coding system to output a compressed image according to the second coding system.

A coding apparatus disclosed in Japan Patent Application Laid Open Gazette No. H10-313463 compresses an input image to output a compressed image. The coding apparatus controls a code amount such that an output code amount is equal to or less than a constant target code amount. The coding apparatus disclosed in Japan Patent Application Laid Open Gazette No. H10-313463 also controls a code amount in a same manner as described above even when the apparatus is included in a transcoder as a component thereof.

The coding apparatus disclosed in Japan Patent Application Laid Open Gazette No. H10-313463 controls a code amount such that an output code amount is equal to or less than a constant target code amount. There is a possibility that the coding apparatus drastically deteriorates image quality after compression compared with that before compression when an input image is a fine image or an image of much movement. There is also a possibility as described above when the coding apparatus disclosed in Japan Patent Application Laid Open Gazette No. H10-313463 is included in a transcoder as a component thereof.

SUMMARY OF THE INVENTION

The present invention is directed to a transcoder for decoding an input image into a decoded image and encoding the decoded image into an output image. The transcoder according to the invention comprises a category setting part which sets a type of the decoded image based on characteristics of the decoded image, a code amount setting part which sets a target code amount of the output image based on the type of the decoded image, and a quantization step value setting part which sets a quantization step value of the output image based on the target code amount of the output image.

According to the invention, a code amount is appropriately controlled without significantly deteriorating image quality after compression compared with image quality before compression.

According to another aspect of the invention, the characteristics of the decoded image include fineness of the decoded image, and the transcoder further comprises a resolution degree calculating part which calculates a resolution degree representing fineness of the decoded image.

The target code amount of the output image can be set depending on fineness of the decoded image.

According to still another aspect of the invention, the characteristics of the decoded image include an intensity of movement of the decoded image, and the transcoder further comprises a moving amount calculating part which calculates a moving amount of the decoded image representing the intensity of movement of the decoded image.

The target code amount of the output image can be distributed to a reference image and a predicted image depending on the intensity of movement of the decoded image.

Therefore, an object of the invention is to provide a technique capable of appropriately controlling a code amount without significantly deteriorating image quality after compression compared with image quality before compression.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a table showing correction code amounts and code amount ratios.

DESCRIPTION OF THE PREFERRED EMBODIMENTS

First Embodiment

[Components of a Transcoder]

Figure 1:
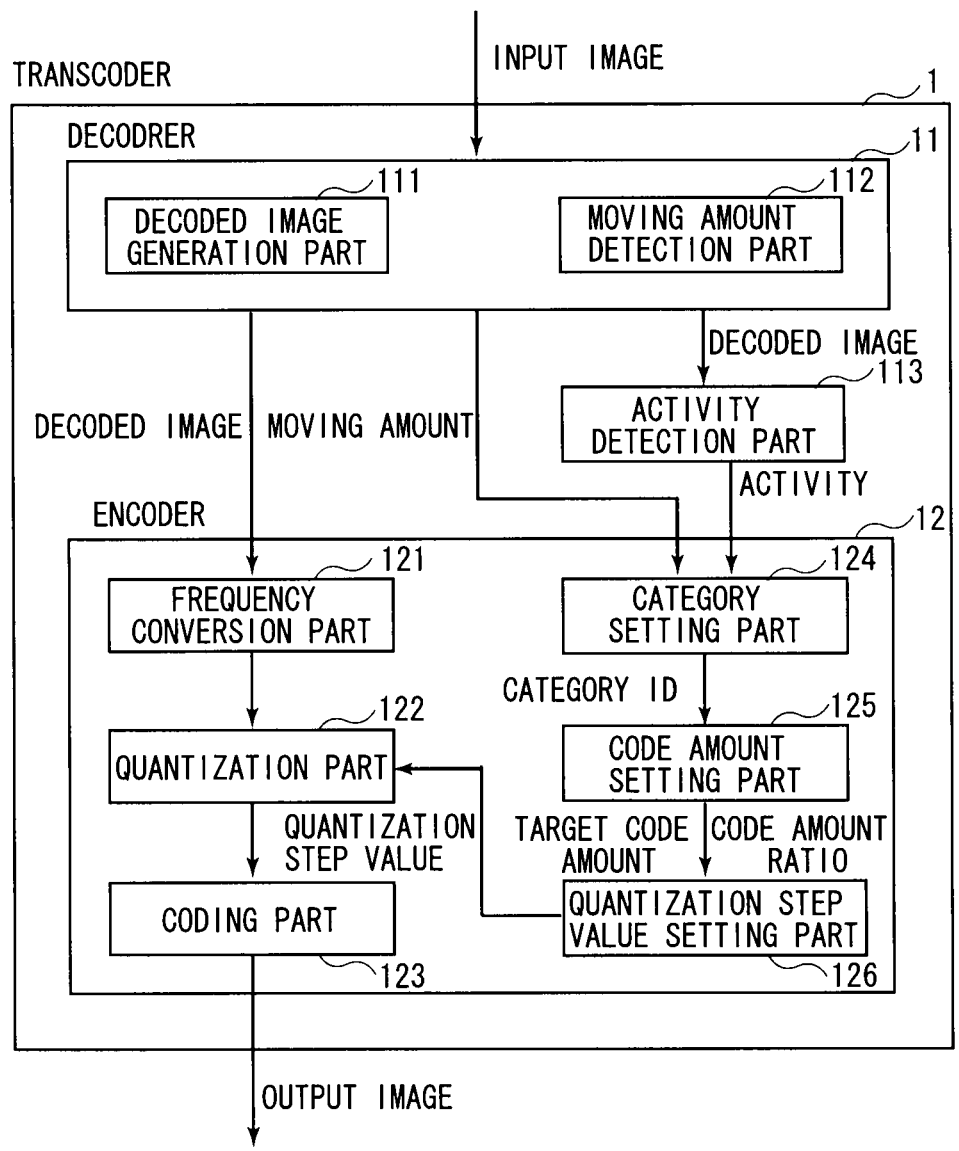
FIG. 1 is a block diagram showing components of a transcoder.

Hereinafter, a first embodiment will be described with reference to drawings. FIG. 1 is a block diagram showing components of a transcoder 1. The transcoder 1 comprises a decoder 11, an encoder 12, an activity detection part 113 and the like.

The decoder 11 inputs an input image from an outside of the transcoder 1. The decoder 11 decodes the input image into a decoded image according to a coding system which the decoder 11 handles. The decoder 11 outputs the decoded image to the encoder 12.

The encoder 12 inputs the decoded image from the decoder 11. The encoder 12 encodes the decoded image into an output image according to a coding system which the encoder 12 handles. The encoder 12 outputs the output image to the outside of the transcoder 1.

The decoder 11 comprises a decoded image generation part 111, a moving amount detection part 112 and the like. The encoder 12 comprises a frequency conversion part 121, a quantization part 122, a coding part 123, a category setting part 124, a code amount setting part 125, a quantization step value setting part 126 and the like.

The decoded image generation part 111 generates a decoded image by executing decoding, inverse-quantization and inverse-frequency-conversion on an input image.

The moving amount detection part 112 detects a moving amount of the decoded image in a process of generating the decoded image. The moving amount is an amount representing an intensity of movement of the decoded image. A specific calculation method of the moving amount is described later with reference to FIG. 2.

The activity detection part 113 detects an activity of the decoded image. The activity is an amount representing fineness of the decoded image. A specific calculation method of the activity is described later with reference to FIG. 2.

The frequency conversion part 121 executes frequency conversion on the decoded image. The quantization part 122 executes quantization on the decoded image on which frequency conversion has been executed, based on the quantization step value of the output image set by the quantization step value setting part 126 which will be described later. The coding part 123 executes encoding on the decoded image on which frequency conversion and quantization have been executed.

The category setting part 124 sets a type of the decoded image based on the activity of the decoded image detected by the activity detection part 113 and the moving amount of the decoded image detected by the moving amount detection part 112. As a specific example, the category setting part 124 sets a type of the decoded image based on whether the decoded image is a fine image and whether the decoded image is an image of much movement.

The code amount setting part 125 sets a target code amount of an output image based on the type of the decoded image set by the category setting part 124. As a specific example, the code amount setting part 125 increases the target code amount of the output image for a fine decoded image. The code amount setting part 125 changes a ratio of the target code amount distributed to a predicted image included in the output image, depending on the moving amount of the decoded image. The ratio of the target code amount distributed to the predicted image is larger for a decoded image of much movement than for a decoded image of little movement.

The quantization step value setting part 126 sets a quantization step value of the output image based on the target code amount of the output image set by the code amount setting part 125. As a specific example, the quantization step value setting part 126 sets the quantization step value of the output image to be small for the fine decoded image. The quantization step value setting part 126 sets the quantization step value of the output image on the predicted image to be smaller for a decoded image of much movement compared with that of little movement.

[Process Flow of Category Setting]

Figure 2:
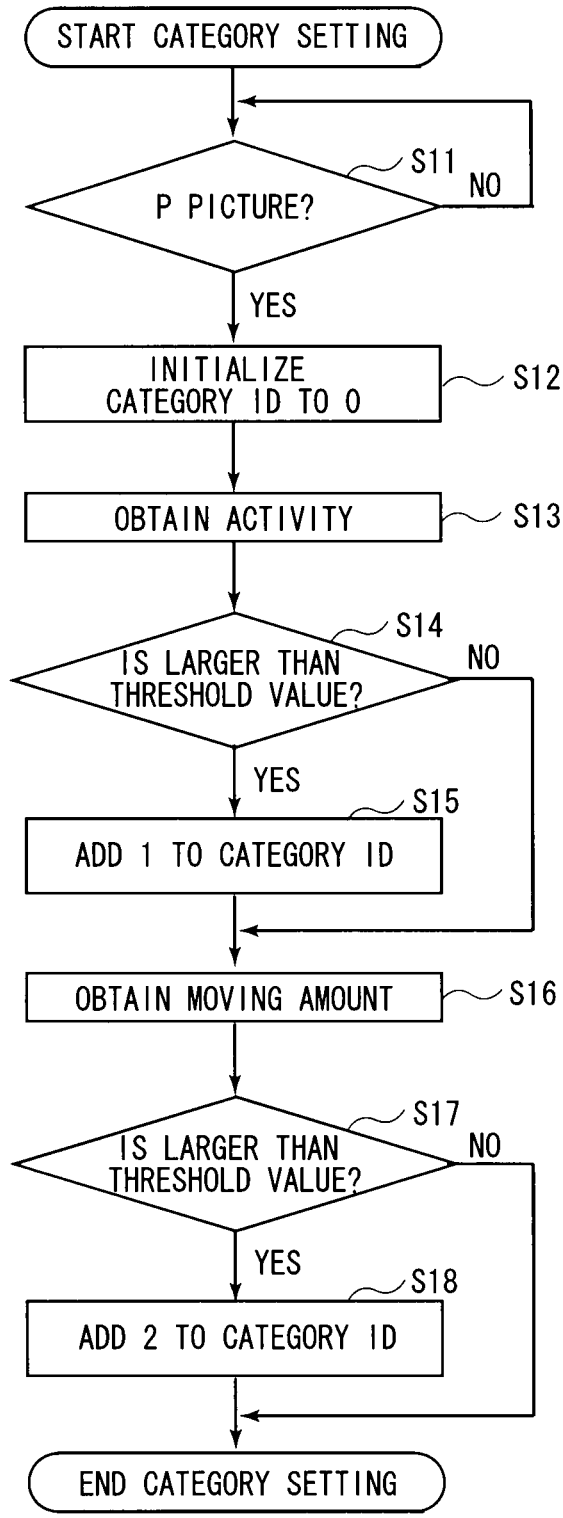
FIG. 2 is a flowchart showing a process flow of a category setting.

FIG. 2 is a flowchart showing a process flow of a category setting. A category setting unit is an arbitrary image unit. The category setting unit may be a GOP (Group of Pictures) unit. The category setting unit may be an image unit between adjacent change of scenes.

The category setting part 124 selects a decoded image used for executing a category setting from a plurality of decoded images included in the category setting unit. The category setting part 124 determines whether the selected decoded image is P picture (step S11).

The category setting part 124 executes the category setting when the selected decoded image is P picture (YES at step S11).

The category setting part 124 doesn't execute the category setting when the selected decoded image is not P picture (NO at step S11). The category setting part 124 selects a decoded image used for executing the category setting from a plurality of decoded images included in the category setting unit until the selected decoded image is P picture (YES at step S11).

First, a reason why the category setting part 124 doesn't execute the category setting when the selected decoded image is not P picture (NO at step S11), will be described. Next, a reason why the category setting part 124 executes the category setting when the selected decoded image is P picture (YES at step S11), will be described.

When the selected decoded image is I picture, the category setting part 124 cannot determine whether a moving amount of the selected decoded image is large or small at Step S17 as described below because the moving amount cannot be obtained from I picture. Therefore, the category setting part 124 doesn't execute the category setting.

When the selected decoded image is B picture, the category setting part 124 can determine whether a moving amount of the selected decoded image is large or small at Step S17 as described below because the moving amount can be obtained from B picture. However, process load of the category setting part 124 is large because B picture is normally communicated in a serial manner. Therefore, the category setting part 124 doesn't execute the category setting. It is to be noted that the category setting part 124 may execute the category setting by selecting B picture.

When the selected decoded image is P picture, the category setting part 124 can determine whether a moving amount of the decoded image is large or small at Step S17 as described below because the moving amount can be obtained from P picture. Then, process load of the category setting part 124 is small because P picture is not normally communicated in a serial manner. Therefore, the category setting part 124 executes the category setting.

The category setting part 124 executes the category setting for the category setting unit communicated in a serial manner. The category setting part 124 initializes a category ID to 0 (step S12) because the category setting part 124 doesn't use the previous category setting in executing the current category setting. The category ID is a type of the decoded image set based on the activity and the moving amount.

The category setting part 124 doesn't execute the category setting when the selected decoded image is not P picture. The category setting part 124 may hold an initial value or a category ID when P picture is selected at the end of the previous transcoding as the category ID until P picture is initially selected when transcoding is started.

The category setting part 124 obtains an activity from the activity detection part 113 for the selected P picture (step S13). The category setting part 124 compares the obtained activity with a predetermined threshold value of the activity (step S14).

An activity is an amount representing fineness of a decoded image. In the invention, the activity is defined as a value normalized by dividing a value obtained by summing difference absolute values between pixel values of adjacent pixels of the decoded image for all adjacent pixels by the total block number of the decoded image.

The category setting part 124 adds 1 to the category ID initialized at step S12 (step S15) when the obtained activity is larger than the predetermined threshold value of the activity (YES at step S14). That is to say, the category setting part 124 updates the category ID from 0 to 1.

The category setting part 124 doesn't add 1 to the category ID initialized at step S12 when the obtained activity is equal to or less than the predetermined threshold value of the activity (NO at step S14). That is to say, the category setting part 124 doesn't update the category ID from 0 to 1.

The category setting part 124 obtains a moving amount of selected P picture from the moving amount detection part 112 (step S16). The category setting part 124 compares the obtained moving amount with a predetermined threshold value of the moving amount (step S17).

A moving amount is an amount representing an intensity of movement of a decoded image. In the invention, the moving amount is defined as a value normalized by dividing a value obtained by summing code amounts of moving vectors in blocks of the decoded image for all blocks of the decode image by the total block number of the decoded image. Alternatively, the moving amount is defined as a value normalized by dividing a value obtained by summing lengths of moving vectors in blocks of the decoded image for all blocks of the decoded image by the total block number of the decoded image.

The category setting part 124 adds 2 to the category ID initialized at step S12 or the category ID updated at step S15 (step S18) when the obtained moving amount is larger than the predetermined threshold value of the moving amount (YES at step S17). That is to say, the category setting part 124 updates the category ID from 0 to 2 or the category ID from 1 to 3.

The category setting part 124 doesn't add 2 to the category ID initialized at step S12 or the category ID updated at step S15 when the obtained moving amount is equal to or less than the predetermined threshold value of the moving amount (NO at step S17). That is to say, the category setting part 124 doesn't update the category ID from 0 to 2 or the category ID from 1 to 3.

The category setting part 124 sets the category ID to 0, 1, 2 or 3 based on the activity and the moving amount. The category setting part 124 outputs the set category ID to the code amount setting part 125.

[Process Flow of Code Amount Setting]

Figure 3:
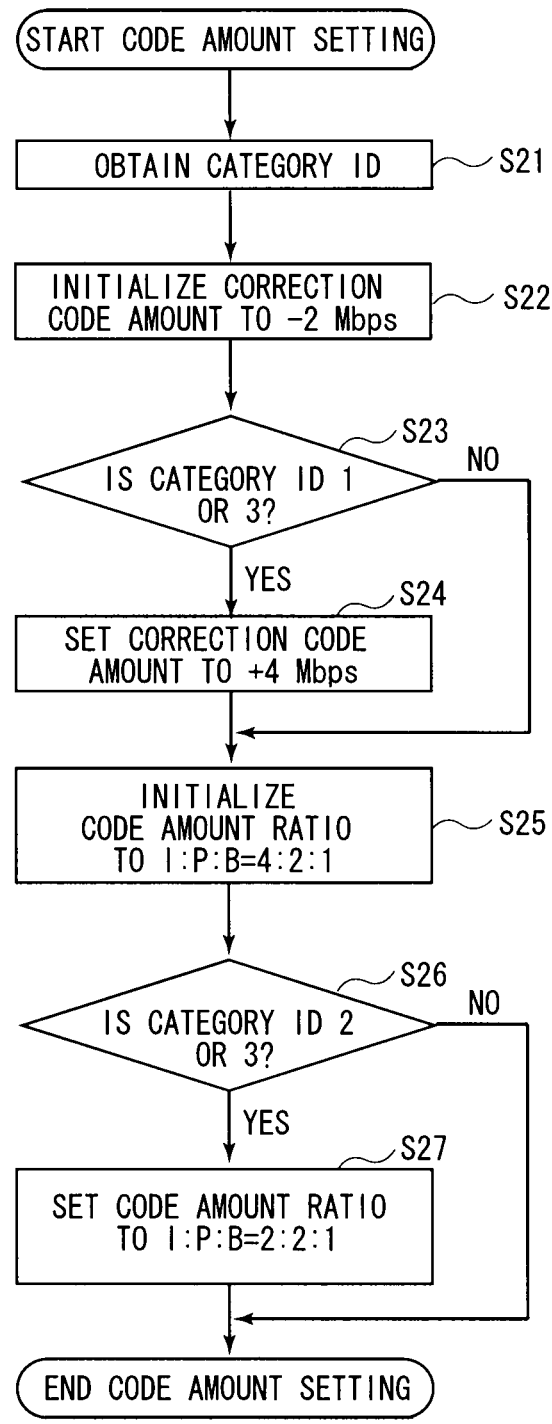
FIG. 3 is a flowchart showing a process flow of a code amount setting.

FIG. 3 is a flowchart showing a process flow of a code amount setting. The code amount setting unit is similar to the category setting unit. The code amount setting part 125 obtains the category ID from the category setting part 124 (step S21). The code amount setting part 125 sets a target code amount and a code amount ratio based on the obtained category ID.

The code amount setting part 125 initializes a correction code amount to −2 Mbps (step S22) because setting of the previous target code amount is not utilized in setting the current target code amount. The correction code amount is a code amount to be added or subtracted as correction to or from the target code amount previously set by utilizing a front picture for the code amount setting unit.

The code amount setting part 125 sets a correction code amount to +4 Mbps (step S24) when the obtained category ID is 1 or 3 (YES at step S23). That is to say, the code amount setting part 125 sets the target code amount after correction for the code amount setting unit by adding 4 Mbps as a correction code amount to the target code amount previously set by utilizing a front picture for the code amount setting unit.

The code amount setting part 125 holds the correction code amount set to −2 Mbps when the obtained category ID is 0 or 2 (NO at step S23). That is to say, the code amount setting part 125 sets the target code amount after correction for the code amount setting unit by subtracting 2 Mbps as a correction code amount from the target code amount previously set by utilizing a front picture for the code amount setting unit.

The code amount setting part 125 initializes the code amount ratio to I:P:B=4:2:1 (step S25) because setting of the previous code amount ratio is not utilized in setting the current code amount ratio. The code amount ratio is a ratio at which the target code amount after correction set at step S22 or step S24 is distributed to each of I picture, P picture, and B picture.

The code amount setting part 125 sets a code amount ratio to I:P:B=2:2:1 (step S27) when the obtained category ID is 2 or 3 (YES at step S26). That is to say, the code amount setting part 125 distributes large ratios in the target code amount after correction set at step S22 or step S24 to P picture and B picture.

The code amount setting part 125 holds the code amount ratio set to I:P:B=4:2:1 when the obtained category ID is 0 or 1 (NO at step S26). That is to say, the code amount setting part 125 doesn't distribute large ratios in the target code amount after correction set at step S22 or step S24 to P picture and B picture.

The code amount setting part 125 sets a code amount ratio to I:P:B=4:2:1 or I:P:B=2:2:1 by setting the correction code amount to −2 Mbps or +4 Mbps based on the category ID. The code amount setting part 125 outputs the set target code amount after correction and the code amount ratio to the quantization step value setting part 126.

The quantization step value setting part 126 sets a quantization step coefficient based on the target code amount after correction and the code amount ratio. The quantization step value setting part 126 sets a quantization step value of the output image by multiplying the quantization step value of the input image by the quantization step coefficient.

FIG. 4 is a table showing correction the code amount and the code amount ratio. FIG. 4 shows the way how the correction code amount and the code amount ratio are set when the category ID is set to 0, 1, 2, or 3.

A case where the category ID is 0 will be described. The activity obtained by the category setting part 124 is equal to or less than the predetermined threshold value of the activity (NO at step S14). Namely, a decoded image in the category setting unit is a flat image. The moving amount obtained by the category setting part 124 is equal to or less than the predetermined threshold value of the moving amount (NO at step S17). That is to say, a decoded image in the category setting unit is an image of little movement.

A case where the category ID is 1 will be described. The activity obtained by the category setting part 124 is larger than the predetermined threshold value of the activity (YES at step S14). Namely, a decoded image in the category setting unit is a fine image. The moving amount obtained by the category setting part 124 is equal to or less than the predetermined threshold value of the moving amount (NO at step S17). That is to say, the decoded image in the category setting unit is an image of little movement.

A case where the category ID is 2 will be described. The activity obtained by the category setting part 124 is equal to or less than the predetermined threshold value of the activity (NO at step S14). Namely, a decoded image in the category setting unit is a flat image. The moving amount obtained by the category setting part 124 is larger than the predetermined threshold value of the moving amount (YES at step S17). That is to say, a decoded image in the category setting unit is an image of much movement.

A case where the category ID is 3 will be described. The activity obtained by the category setting part 124 is larger than the predetermined threshold value of the activity (YES at step S14). Namely, a decoded image in the category setting unit is a fine image. The moving amount obtained by the category setting part 124 is larger than the predetermined threshold value of the moving amount (YES at step S17). That is to say, a decoded image in the category setting unit is an image of much movement.

The decoded image in the code amount setting unit is a fine image when the category ID is 1 or 3 (YES at step S23). Therefore, +4 Mbps is set as the correction code amount (step S24).

The decoded image in the code amount setting unit is a flat image when the category ID is 0 or 2 (NO at step S23). Therefore, −2 Mbps is set as the correction code amount (step S22).

The decoded image in the code amount setting unit is an image of much movement when the category ID is 2 or 3 (YES at step S26). Therefore, I:P:B=2:2:1 is set as the code amount ratio (step S27). That is to say, large ratios in the target code amount after correction is distributed to P picture and B picture.

The decoded image in the code amount setting unit is an image of little movement when the category ID is 0 or 1 (NO at step S26). Therefore, I:P:B=4:2:1 is set as the code amount ratio (step S25). That is to say, large ratios in the target code amount after correction isn't distributed to P picture and B picture.

In the first embodiment, the target code amount is appropriately set depending on fineness of a decoded image. Further, the code amount ratio of a reference image and a predicted image is appropriately set depending on an intensity of movement of the decoded image.

According to the first embodiment, in a decoded image which is fine and of much movement, image quality after compression can be kept to be high more effectively than that in the conventional art when an average value of the target code amount is fixed for a long period of time. According to the first embodiment, in a decoded image which is fine and of much movement, an average value of the target code amount can be suppressed for a long period of time more effectively than that in the conventional art when image quality after compression is fixed.

Second Embodiment

Next, a second embodiment will be described. In the first embodiment, only one predetermined threshold value of the activity is prepared. Therefore, fineness of a decoded image is evaluated at two stages. Further, only one predetermined threshold value of a moving amount is prepared. Therefore, an intensity of movement of the decoded image is evaluated at two stages.

In the second embodiment, a plurality of predetermined threshold values of the activity are prepared. Therefore, fineness of the decoded image is evaluated at multiple stages. Further, a plurality of predetermined threshold values of a moving amount are prepared. Therefore, an intensity of movement of the decoded image is evaluated at multiple stages.

A transcoder 1 according to the second embodiment comprises same components as those comprised in the transcoder 1 according to the first embodiment. A category setting part 124 and a code amount setting part 125 according to the second embodiment execute different processes from those executed by the category setting part 124 and the code amount setting part 125 according to the first embodiment.

The category setting part 124 compares an obtained activity with a plurality of predetermined threshold values of the activity, instead of step S14. The category setting part 124 sets a category ID based on the comparison result of the activity, instead of step S15.

The category setting part 124 compares an obtained moving amount with a plurality of predetermined threshold values of the moving amount, instead of step S17. The category setting part 124 sets the category ID based on the comparison result of the moving amount, instead of step S18.

The code amount setting part 125 sets a correction code amount at multiple stages based on the obtained category ID, instead of step S22 to step S24. The code amount setting part 125 sets a code amount ratio at multiple stages based on the obtained category ID, instead of step S25 to step S27.

Figure 5A:
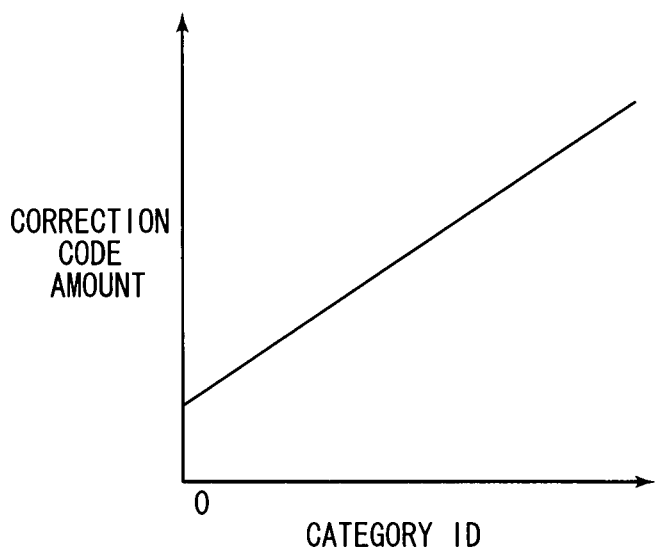
FIGS. 5A and 5B are graphs showing a correction code amount and a code amount ratio.

FIG. 5A is a graph showing a correction code amount. The graph schematically shows a state that the correction code amount gradually increases as the category ID gradually increases from 0.

Figure 5B:
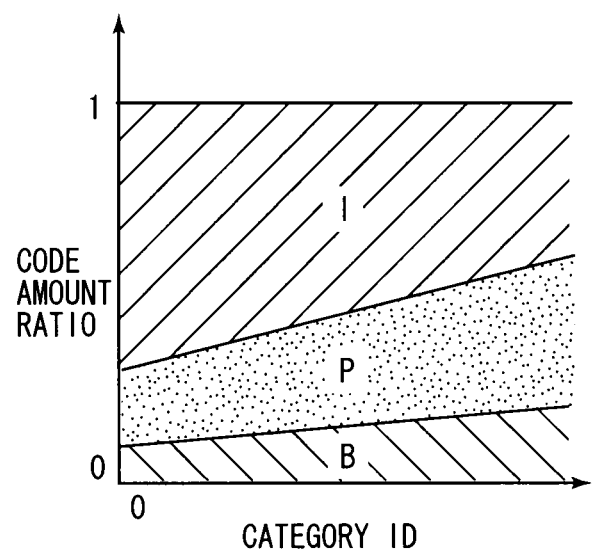

FIG. 5B shows a graph showing a code amount ratio. The graph schematically shows a state that a ratio of the code amount distributed to I picture relative to the target code amount after correction gradually decreases and a ratio of the code amount distributed to P picture and B picture relative to the target code amount after correction gradually increases as the category ID gradually increases from 0.

In the second embodiment, the target code amount is appropriately set at multiple stages depending on fineness of a decoded image. Further, the code amount ratio of a reference image and a predicted image is appropriately set at multiple stages depending on an intensity of movement of the decoded image.

According to the second embodiment, in a decoded image which is fine and of much movement, image quality after compression can be kept to be high more effectively than that in the first embodiment when an average value of the target code amount is fixed for a long period of time. According to the second embodiment, in a decoded image which is fine and of much movement, an average value of the target code amount can be suppressed for a long period of time more effectively than that in the first embodiment when image quality after compression is fixed.

Modified Example

In both embodiments, a predetermined upper limit code amount may be set for the target code amount after correction. In this case, the correction code amount may be set based on the predetermined upper limit code amount. The transcoder 1 can prevent the output image from outputting exceeding a line speed.

In both embodiments, a predetermined lower limit code amount may be set for the target code amount after correction. In this case, the correction code amount may be set based on the predetermined lower limit code amount. The transcoder 1 can prevent the output image from outputting while deteriorating the image quality.

In both embodiments, the code amount setting part 125 may change the target code amount after correction to be output to the quantization step value setting part 126 from an amount previously set to an amount currently set at one stage when the target code amount after correction currently set is larger than the target code amount after correction previously set. The transcoder 1 can prevent image quality from deteriorating when a flat decoded image is transferred to a fine decoded image.

In both embodiments, the code amount setting part 125 may moderately change the target code amount after correction to be output to the quantization step value setting part 126 from an amount previously set to an amount currently set when the target code amount after correction currently set is smaller than the target code amount after correction previously set. As a specific example, the code amount setting part 125 may moderately change the correction code amount from +4 Mbps to −2 Mbps by reducing the correction code amount by 1 Mbps on a picture to picture, P picture to P picture, or GOP to GOP basis when the correction code amount previously set is +4 Mbps and the correction code amount currently set is −2 Mbps. The transcoder 1 can prevent image quality from deteriorating when a fine decoded image is transferred to a flat decoded image.

While the invention has been shown and described in detail, the foregoing description is in all aspects illustrative and not restrictive. It is therefore understood that numerous modifications and variations can be devised without departing from the scope of the invention.

What is claimed is:

1. A transcoder that decodes an input image into a decoded image and encoder said decoded image into an output image, said transcoder comprising:
   an encoder including,
      a category setting unit that sets a type of an image group composed of a plurality of images including said decoded image based on characteristic of said decoded image;
      a code amount setting unit that sets a target code amount of said image group based on said type of said image group; and
      a quantization step value setting unit that sets a quantization step value for encoding the images included in said image group based on said target code amount of said image group.

2. The transcoder according to claim 1, wherein said characteristics of said decoded image include fineness of said decoded image, and
   the transcoder further comprises:
   a resolution degree calculating unit that calculates a resolution degree representing said fineness of said decoded image.

3. The transcoder according to claim 2, wherein said category setting unit includes:
   a first category setting unit that sets said type of said image group to a first type when said resolution degree of said decoded image is larger than a predetermined resolution degree; and
   a second category setting unit that sets said type of said image group to a second type when said resolution degree of said decoded image is equal to or less than said predetermined resolution degree, and
   said code amount setting unit includes:
   a first code amount setting unit that sets said target code amount of said image group to a first code amount when said type of said image group is said first type; and
   a second code amount setting unit that sets said target code amount of said image group to a second code amount that is smaller than said first code amount when said type of said image group is said second type.

4. The transcoder according to claim 3, wherein said code amount setting unit includes:
   a provisional code amount setting unit that provisionally sets said target code amount of said image group to a provisional code amount,
   said first code amount setting unit includes:
   a first code amount correction unit that sets said target code amount of said image group to said first code amount by correcting said provisional code amount on the basis of a first correction code amount, and
   said second code amount setting unit includes:
   a second code amount correction unit that sets said target code amount of said image group to said second code amount by correcting said provisional code amount on the basis of a second correction code amount.

5. The transcoder according to claim 2, wherein said resolution degree of said decoded image includes:
a value normalized by dividing a value obtained by summing difference absolute values between pixel values of adjacent pixels of said decoded image for all adjacent pixels of the decoded image by a total block number of said decoded image.

6. The transcoder according to claim 1, wherein said characteristics of said decoded image includes:
an intensity of movement of said decoded image, and
the transcoder further comprises a moving amount calculating unit that calculates a moving amount of said decoded image representing said intensity of movement of said decoded image.

7. The transcoder according to claim 6, wherein said category setting unit includes:
a third category setting unit that sets said type of said image group to a third type when said moving amount of said decoded image is larger than a predetermined moving amount; and
a fourth category setting unit that sets said type of said image group to a fourth type when said moving amount of said decoded image is equal to or less than said predetermined moving amount, and
said code amount setting unit includes:
a third code amount setting unit that sets a code amount ratio of one of the plurality of images that is to be encoded as a reference image to a first ratio, and sets a code amount ratio of one of the plurality of images that is to be encoded as a predicted image to a second ratio when said type of said image group is said third type; and
a fourth code amount setting unit that sets said code amount ratio of said image that is to be encoded as a reference image to a third ratio that is larger than said first ratio, and sets said code amount ratio of said image that is to be encoded as a predicted image to a fourth ratio that is smaller than said second ratio when said type of said image group is said fourth type.

8. The transcoder according to claim 6, wherein said moving amount of said decoded image includes:
a value normalized by dividing a value obtained by summing code amounts of moving vectors in blocks of said decoded image for all blocks of said decoded image by the total block number of said decoded image.

9. The transcoder according to claim 6, wherein said moving amount of said decoded image includes:
a value normalized by dividing a value obtained by summing lengths of moving vectors in blocks of said decoded image for all blocks of said decoded image by the total block number of said decoded image.

10. The transcoder according to claim 1, wherein said category setting unit includes:
a predicted image utilizing unit that sets said type of said image group by utilizing a predicted image of said decoded image.

11. The transcoder according to claim 1, wherein said code amount setting unit includes:
a code amount upper limit setting unit that sets said target code amount of said image group to be smaller than a predetermined upper limit code amount; and
a code amount lower limit setting unit that sets said target code amount of said image group to be larger than a predetermined lower limit code amount.

12. The transcoder according to claim 1, wherein said code amount setting unit includes:
a code amount increase unit that changes said target code amount of said image group to be output to said quantization step value setting unit from a target code amount set for a previous image group to a target code amount set for a subsequent image group at one stage when said target code amount set for said subsequent image group is larger than said target code amount set for said previous image group.

13. The transcoder according to claim 1, wherein said code amount setting unit includes:
a code amount decrease unit that changes said target code amount of said image group to be output to said quantization step value setting unit from a target code amount set for a previous image group to a target code amount set for a subsequent image group moderately rather than at a predetermined rate when said target code amount set for said subsequent image group is smaller than said target code amount set for said previous image group.

14. The transcoder according to claim 1, wherein said category setting unit receives an activity of said decoded image detected by an activity detection unit and a moving amount of said image group detected by a moving amount detection unit, generates a category ID, and sets said type of said image group based on said activity and said moving amount.

15. The transcoder according to claim 14, wherein said code amount setting unit receives said category ID from said category setting unit and sets said target code amount and a code amount ratio of said image group based on said category ID.

16. The transcoder according to claim 15, wherein said quantization step value setting unit receives said target code amount and said code amount ratio of said image group from said code amount setting unit and sets said quantization step value based on said target code amount and said code amount ratio.

\* \* \* \* \*